(12) United States Patent
Su et al.

(10) Patent No.: US 10,298,923 B2
(45) Date of Patent: May 21, 2019

(54) EFFICIENT ARCHITECTURE FOR LAYERED VDR CODING

(75) Inventors: Guan-Ming Su, Fremont, CA (US); Sheng Qu, San Jose, CA (US); Walter C. Gish, Oak Park, CA (US); Zhen Li, Cupertino, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 821 days.

(21) Appl. No.: 14/116,326

(22) PCT Filed: May 11, 2012

(86) PCT No.: PCT/US2012/037479
§ 371 (c)(1),
(2), (4) Date: Nov. 7, 2013

(87) PCT Pub. No.: WO2012/158504
PCT Pub. Date: Nov. 22, 2012

(65) Prior Publication Data
US 2014/0105289 A1    Apr. 17, 2014

Related U.S. Application Data (60) Provisional application No. 61/486,703, filed on May 16, 2011.

(51) Int. Cl.
*H04N 19/105* (2014.01)
*H04N 19/30* (2014.01)
(Continued)

(52) U.S. Cl.
CPC ......... *H04N 19/105* (2014.11); *H04N 19/186* (2014.11); *H04N 19/187* (2014.11);
(Continued)

(58) Field of Classification Search
None
See application file for complete search history.

(56) References Cited

U.S. PATENT DOCUMENTS

| 7,933,462 B2 | 4/2011 | Ward | |
| 8,139,081 B1 * | 3/2012 | Daniel | H04N 19/40 345/546 |

(Continued)

FOREIGN PATENT DOCUMENTS

| CN | 101663896 | 3/2010 | |
| WO | WO 2007082562 A2 * | 7/2007 | H04N 19/136 |

(Continued)

OTHER PUBLICATIONS

Wu et al. "Bit-depth scalability compatible to H.264/AVC-scalable extension", Journal of Visual Communication and Image Representation, vol. 19, No. 6, Aug. 1, 2008 (Aug. 1, 2008), pp. 372-381, XP025611597, ISSN: 1047-3203, DOI: 10.1016/J.JVCIR. 2008.06. 003.*

(Continued)

*Primary Examiner* — William C Vaughn, Jr.
*Assistant Examiner* — Stuart D Bennett (57) ABSTRACT

In layered Visual Dynamic range (VDR) coding, inter-layer prediction requires several color-format transformations between the input VDR and Standard Dynamic Range (SDR) signals. Coding and decoding architectures are presented wherein inter-layer prediction is performed in the SDR-based color format, thus reducing computational complexity in both the encoder and the decoder, without compromising coding efficiency or coding quality.

15 Claims, 4 Drawing Sheets

(51) Int. Cl.
*H04N 19/186* (2014.01)
*H04N 19/187* (2014.01)
*H04N 19/85* (2014.01)
*H04N 19/98* (2014.01)

(52) U.S. Cl.
CPC ............. *H04N 19/30* (2014.11); *H04N 19/85* (2014.11); *H04N 19/98* (2014.11)

(56) References Cited

U.S. PATENT DOCUMENTS

| | | | |
|---|---|---|---|
| 8,537,893 B2 | 9/2013 | Efremov | |
| 2005/0259729 A1* | 11/2005 | Sun | H04N 19/33 375/240.1 |
| 2009/0190658 A1 | 7/2009 | Park | |
| 2009/0257492 A1* | 10/2009 | Andersson | H04N 19/105 375/240.12 |
| 2009/0296808 A1* | 12/2009 | Regunathan | H04N 19/197 375/240.03 |
| 2010/0172411 A1* | 7/2010 | Efremov | H04N 19/136 375/240.12 |
| 2013/0148029 A1 | 6/2013 | Gish | |

FOREIGN PATENT DOCUMENTS

| | | |
|---|---|---|
| WO | 2012/142471 | 10/2012 |
| WO | 2012/148883 | 11/2012 |

OTHER PUBLICATIONS

Liu et al. "Bit-depth Scalable Coding for High Dynamic Range Video", Visual Communications and Image Processing 2008, Prof. of SPIE-IS&T Electronic Imaging, SPIE vol. 6822, 682200.*

Liu et al. "Bit-depth scalability compatible to H.264/AVC-scalable extension", Journal of Visual Communication and Image Representation, vol. 19, No. 6, Aug. 1, 2008 (Aug. 1, 2008), pp. 372-381, XP025611597, ISSN: 1047-3203, DOI: 10.1016/J.JVCIR.2008.06. 003.*

Liu et al. "Bit-depth scalability compatible to H.264/AVC-scalable extension", Journal of Visual Communication and Image Representation, vol. 19, No. 6, Aug. 1, 2008 (Aug. 1, 2008), pp. 372-381, XP025611697, ISSN: 1047-3203, DOI: 10.1016/J.JVCIR.2008.06. 003.*

Liu et al., "Bit-depth scalability compatible to H.264/AVC-scalable extension", Journal of Visual Communication and Image Representation, vol. 19, No. 6, Aug. 1, 2008 (Aug. 1, 2008), pp. 372-381, XP025611697, ISSN: 1047-3203, DOI: 10.1016/J.JVCIR.2008.06. 003 (Year: 2008).*

Wu Y et al. "Bit-Depth Scalability Compatible to H264/AVC-Scalable Extensions", Journal of Visual Communication and Image Representation, vol. 19, No. 6, Aug. 1, 2008, pp. 372-381.

Park J. H. et al "Requirement of SVC Color Space Scalability" JVT Meeting, MPEG meeting Oct. 21-26, 2007.

Winken, M. et al "Bit-Depth Scalable Video Coding", IEEE International Conference on Image Processing, Sep. 1, 2007, pp. 1-5 to 1-8.

Mantiuk, R. et al. "Backward Compatible High Dynamic Range MPEG Video Compression", ACM Transactions on Graphics, Jul. 30, 2006, pp. 713-723.

Sullivan G.J. et al "The H.264/AVC Advanced Video Coding Standard: Overview and Introduction to the Fidelity Range Extensions", Proc. of SPIE, vol. 5558, Nov. 1, 2004, pp. 454-474.

Schwarz, H. et al. "Overview of the Scalable Extension of the H.264/MPEG-4 AVC Video Coding Standard" IEEE Transactions on Circuits and Systems for Video Technology, vol. 17, No. 9, Sep. 1, 2007, pp. 1103-1120.

* cited by examiner

EFFICIENT ARCHITECTURE FOR LAYERED VDR CODING

CROSS-REFERENCE TO RELATED APPLICATIONS

This application claims priority to U.S. Provisional Patent Application No. 61/486,703 filed 16 May 2011, which is hereby incorporated by reference in its entirety.

TECHNOLOGY

The present invention relates generally to images. More particularly, an embodiment of the present invention relates to efficient color-space transformations in layered coding of high dynamic range images.

BACKGROUND

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'visual dynamic range' or 'variable dynamic range' (VDR) may individually or interchangeably relate to the DR that is simultaneously perceivable by a HVS. As used herein, VDR may relate to a DR that spans 5-6 orders of magnitude. Thus while perhaps somewhat narrower in relation to true scene referred HDR, VDR nonetheless represents a wide DR breadth. As used herein, the term 'simultaneous dynamic range' may relate to VDR.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR), also referred to as a standard dynamic range (SDR), in relation to VDR and HDR.

Advances in their underlying technology however allow more modern display designs to render image and video content with significant improvements in various quality characteristics over the same content, as rendered on less modern displays. For example, more modern display devices may be capable of rendering high definition (HD) content and/or content that may be scaled according to various display capabilities such as an image scaler. Moreover, some more modern displays are capable of rendering content with a DR that is higher than the SDR of conventional displays.

For example, some modern LCD displays have a backlight unit (BLU) that comprises a light emitting diode (LED) array. The LEDs of the BLU array may be modulated separately from modulation of the polarization states of the active LCD elements. This dual modulation approach is extensible (e.g., to N-modulation layers wherein N comprises an integer greater than two), such as with controllable intervening layers between the BLU array and the LCD screen elements. Their LED array based BLUs and dual (or N-) modulation effectively increases the display referred DR of LCD monitors that have such features.

Such "HDR displays" as they are often called (although actually, their capabilities may more closely approximate the range of VDR) and the DR extension of which they are capable, in relation to conventional SDR displays represent a significant advance in the ability to display images, video content and other visual information. The color gamut that such an HDR display may render may also significantly exceed the color gamut of more conventional displays, even to the point of capably rendering a wide color gamut (WCG). Scene related HDR or VDR and WCG image content, such as may be generated by "next generation" movie and TV cameras, may now be more faithfully and effectively displayed with the "HDR" displays (hereinafter referred to as 'HDR displays').

As with the scalable video coding and HDTV technologies, extending image DR typically involves a bifurcate approach. For example, scene referred HDR content that is captured with a modern HDR capable camera may be used to generate an SDR version of the content, which may be displayed on conventional SDR displays. In one approach, generating the SDR version from the captured VDR version may involve applying a tone mapping operator (TMO) to intensity (e.g., luminance, luma) related pixel values in the HDR content. In a second approach, as described in U.S. provisional application 61/376,907 "Extending Image Dynamic Range", by W. Gish et al., herein incorporated by reference for all purposes, generating an SDR image may involve applying an invertible operator (or predictor) on the VDR data. To conserve bandwidth or for other considerations, transmission of the actual captured VDR content may not be a best approach.

Thus, an inverse tone mapping operator (iTMO), inverted in relation to the original TMO, or an inverse operator in relation to the original predictor, may be applied to the SDR content version that was generated, which allows a version of the VDR content to be predicted. The predicted VDR content version may be compared to originally captured HDR content. For example, subtracting the predicted VDR version from the original VDR version may generate a residual image. An encoder may send the generated SDR content as a base layer (BL), and package the generated SDR content version, any residual image, and the iTMO or other predictors as an enhancement layer (EL) or as metadata.

Sending the EL and metadata, with its SDR content, residual and predictors, in a bitstream typically consumes less bandwidth than would be consumed in sending both the HDR and SDR contents directly into the bitstream. Compatible decoders that receive the bitstream sent by the encoder may decode and render the SDR on conventional displays. Compatible decoders however may also use the residual image, the iTMO predictors, or the metadata to compute a predicted version of the HDR content therefrom, for use on more capable displays In such layered VDR coding, signals may be represented at different bit depths, at different color spaces, and at different chroma sub sampling formats, all of which may force a variety of computer-intensive transformations from a first color format to a second color format.

As used herein, the term "color format" relates to a color representation that comprises two variables: a) a color space variable (for example: RGB, YUV, YCbCr, and the like) and a chroma subsampling variable (for example: 4:4:4, 4:2:0, and the like.) For example, a VDR signal may have an RGB 4:4:4 color format, while an SDR signal may have a YCbCr 4:2:0 color format. Embodiments related to methods and architectures for efficient color-format processing in VDR layered coding are presented herein.

In an example embodiment, in the encoder, both the SDR-to-VDR predictor and a residual non-linear equalizer operate in the SDR color format. This allows the decoder to require far less color-format related computations, with no degradation in video quality.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Given a pair of corresponding VDR and SDR images, such as images that represent the same scene, each at different levels of dynamic range, improved coding of the residual signal in layered VDR coding is achieved. The VDR image is coded by combining a base layer (e.g., the SDR image) and a residual as an enhancement layer. In an embodiment, the enhancement layer comprises a difference between the original VDR image and a version thereof that is predicted, e.g., from the base layer. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the layered coding of images with high dynamic range. An embodiment applies layer prediction and the non-linear quantization of the residual in the color format of the SDR signal, thus reducing computation complexity related to color-format transformations without compromising picture quality or coding efficiency.

Example VDR-SDR System

Figure 1:
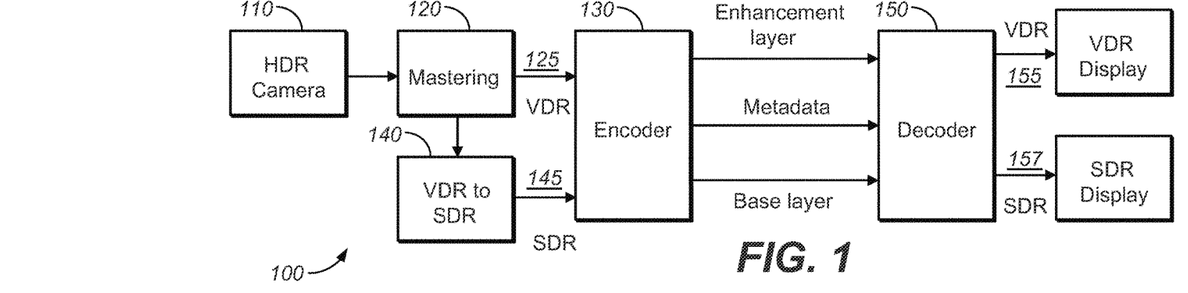
FIG. 1 depicts an example data flow for a VDR-SDR system, according to an embodiment of the present invention.

FIG. 1 depicts an example data flow in a VDR-SDR system 100, according to an embodiment of the present invention. An HDR image or video sequence is captured using HDR camera 110. Following capture, the captured image or video is processed by a mastering process to create a target VDR image 125. The mastering process may incorporate a variety of processing steps, such as: editing, primary and secondary color correction, color transformation, and noise filtering. The VDR output 125 of this process represents the director's intend on how the captured image will be displayed on a target VDR display.

The mastering process may also output a corresponding SDR image 145, representing the director's intend on how the captured image will be displayed on a legacy SDR display. The SDR output 145 may be provided directly from mastering circuit 120 or it may be generated by a separate VDR-to-SDR converter 140.

In an example embodiment, the VDR 125 and SDR 145 signals are input into an encoder 130. Encoder 130 creates a coded bitstream which reduces the bandwidth required to transmit the VDR and SDR signals. Moreover, encoder 130 functions to encode a signal that allows a corresponding decoder 150 to decode and render either the SDR or VDR signal components. In an example implementation, encoder 130 may be a layered encoder, such as one of those defined by the MPEG-2 and H.264 coding standards, which represents its output as a base layer, an optional enhancement layer, and metadata. As defined herein, the term "metadata" relates to any auxiliary information that is transmitted as part of the coded bitstream and assists a decoder to render a decoded image. Such metadata may include, but are not limited to, such data as: color space or gamut information, dynamic range information, tone mapping information, or other predictor and quantizer operators, such as those described herein.

On the receiver, decoder 150 uses the received coded bitstreams and metadata to render either an SDR image 157 or a VDR image 156, according to the capabilities of the target display. For example, an SDR display may use only the base layer and the metadata to render an SDR image. In contrast, a VDR display may use information from all input layers and the metadata to render a VDR signal.

Figure 2:
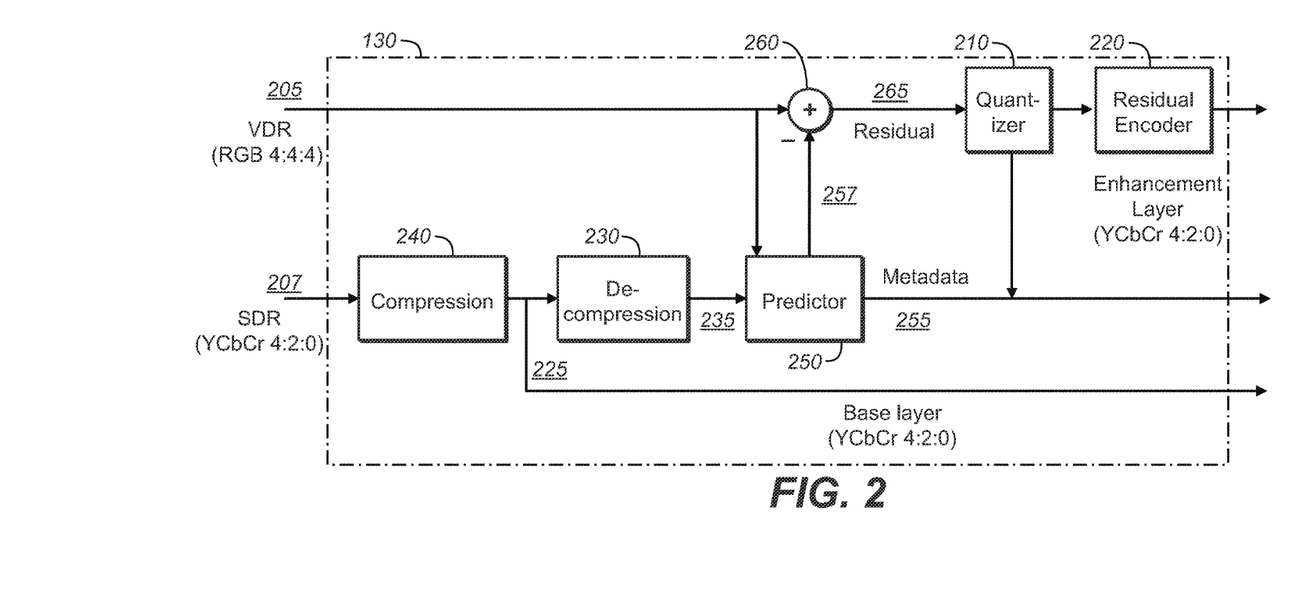
FIG. 2 depicts an example layered VDR encoding system according to an embodiment of the present invention.

FIG. 2 depicts an example implementation of encoder 130 incorporating the methods of this invention. In FIG. 2, VDR input 205 may be represented as 16-bit (fixed point or floating point) RGB 4:4:4 while SDR input 207 is typically 8-bit YCbCr (or YUV), 4:2:0, ITU Rec. 709 data; however the methods of this embodiment apply to other VDR and SDR representations as well. For example, some implementations may use an enhanced SDR input, SDR', which may have the same color space (primaries and white point) as SDR, but may use high precision, say 12-bits per pixel, with all color components at full spatial resolution (e.g., 4:4:4 RGB). The SDR input 207 is applied to compression system 240. Depending on the application, compression system 240 can be either lossy, such as according to the H.264 or MPEG-2 standards, or lossless. The output of the compression system 240 may be transmitted as a base layer 225. To reduce drift between the encoded and decoded signals, encoder 130 may follow compression process 240 with a corresponding decompression process 230. Signal 235 represents the SDR input as it will be received by a decoder. Predictor 250, as described for example in U.S. provisional application 61/475,359, "Multiple color channel multiple regression predictor", by G-M. Su et al., using input VDR 205 and SDR 235 data will create signal 257 which represents an approximation or estimate of input VDR 205. Adder 260 subtracts the predicted VDR 257 from the original VDR 205 to form output residual signal 265. Residual 265 may also be coded by another lossy or lossless encoder 220, such as those defined by the MPEG standards, and may be multiplexed in the output bit stream and transmitted to the decoder as an enhancement layer.

Predictor 250 may also provide the prediction parameters being used in the prediction process as metadata 255. Since prediction parameters may change during the encoding process, for example, on a frame by frame basis, or on a scene by scene basis, these metadata may be transmitted to the decoder as part of the data that also include the base layer and the enhancement layer.

Residual 265 represents the difference between two VDR signals, thus it is expected to be represented by more than 8-bits per color component. In many possible implementations, encoder 220 may not be able to support the full dynamic range of this residual signal. In an example implementation, the residual may be 16 bits and the residual encoder 220 may be a standard H.264, 8-bit, encoder. In order for encoder 220 to accommodate the dynamic range of residual 265, quantizer 210 quantizes residual 265 from its original bit-depth representation (say 12 or 16 bits) to a lower bit-depth representation. The quantizer parameters may also be multiplexed into the metadata bitstream 255.

In one possible implementation, one may pre-process residual 265 by a non-linear quantizer, such as the one described in U.S. provisional application 61/478,836, "Non Linear VDR Residual Quantizer," by G-M Su et al.

Figure 3:
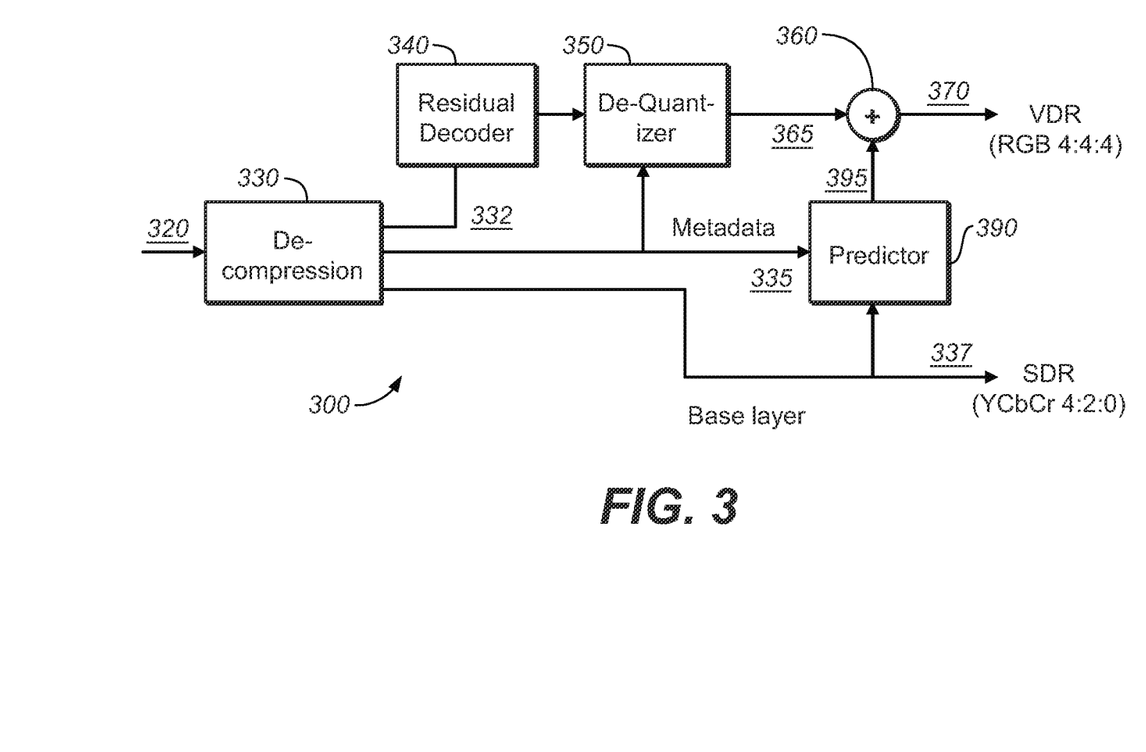
FIG. 3 depicts an example layered VDR decoding systems according to an embodiment of the present invention.

FIG. 3 depicts in more detail an example implementation of decoder 150. Decoding system 300 receives a coded bitstream 320 that may combine a base layer 337, an enhancement layer (or residual) 332, and metadata 335, which are extracted following decompression 330. For example, in a VDR-SDR system, the base layer 337 may represent the SDR representation of the coded signal and the metadata 335 may include information related the prediction (250) and quantization (210) steps used in the encoder. Residual 332 is decoded (340), de-quantized (350) as decoded de-quantized residual 365, and added (360) to the output 395 of the predictor 390 to generate the output VDR signal 370. As in the encoder, VDR and SDR signals may be represented using different color formats, such as RGB 4:4:4 for the VDR signal and YCbCr (or YUV) 4:2:0 for the SDR signal.

Color-Format Transformations

As depicted in FIG. 2, SDR and VDR input signals to encoder 130 may have different color format representations. The goal of encoder 130 is to not only compress the signals as efficiently as possible, but also preserve image quality. Compression blocks 240 and 220 operate far more efficiently when the input signals are represented in a Luma-Chroma color space (such as YUV or YCbCr); however, predictor 250 and quantizer 210 may operate in either the VDR or the SDR color spaces. However, regardless of what color format space is chosen, both the encoder and the decoder will be required to perform color-format transformations. It is one goal of this invention to reduce the computation requirements for such color-format transformations.

Figure 4A:
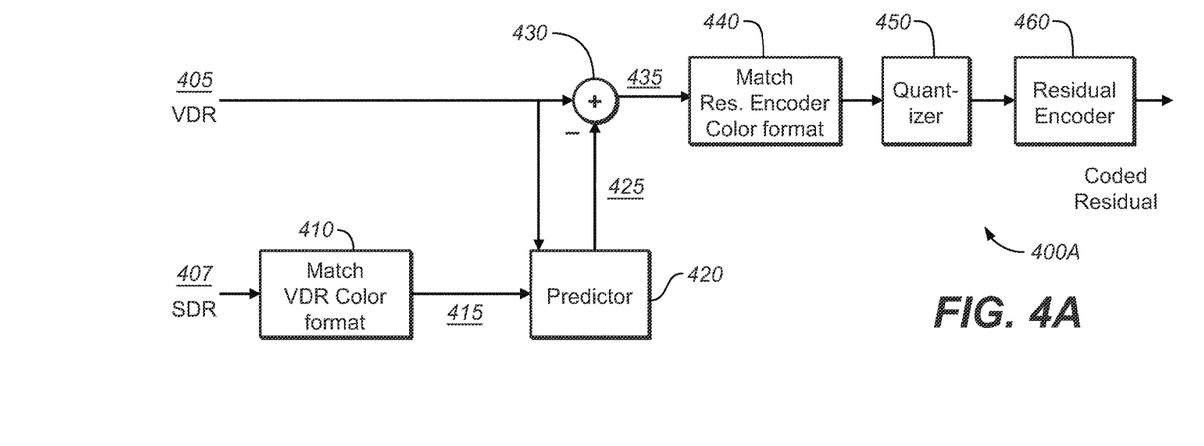
FIG. 4A depicts an example of color-format processing in a layered VDR encoding system.

FIG. 4A depicts the color-format transformation operations when the predictor 250 operates in the VDR color format. In FIG. 4A, in block 410, SDR input 407 is transformed to match the VDR color format. For example, if VDR input 405 is in RGB 4:4:4 format and SDR input 407 is in YCbCr 4:2:0 format, then block 410 may convert SDR YCbCr 4:2:0 to SDR RGB 4:4:4 in two steps: a) chroma up-sample YCbCr 4:2:0 to YCbCr 4:4:4 using any of the well-known up-sampling and interpolation techniques, and b) color transform YCbCr 4:4:4 to RGB 4:4:4 using well known color transform operations.

From FIG. 4A, the output 425 of the predictor and the residual 435 will also be in VDR color format (say, RGB 4:4:4). Residual encoder may be an MPEG (say MPEG-2, MPEG-4, or H.264) encoder operating in YCbCr 4:2:0 format. Such an implementation requires that residual 435 being transformed to match the color format of the residual encoder. Block 440 transforms input signal from the VDR input format (say, RGB 4:4:4) to the color format of the residual encoder (say, YCbCr 4:2:0). For example, if the color format of the residual encoder is YCbCr 4:2:0, then block 440 may convert RGB 4:4:4 into YCbCr 4:2:0 in two steps: a) color transform RGB 4:4:4 to YCbCr 4:4:4 using well known color transform operations, and b) chroma down-sample YCbCr 4:4:4 to YCbCr 4:2:0.

Block 440 may be positioned before the quantizer 450 (as depicted) or after the quantizer 450 (not shown). Because of the color sub-sampling in block 440, positioning color-format transform block 440 before the quantizer 450 (before residual encoder 460) reduces significantly the computations on the quantizer as well.

Figure 4B:
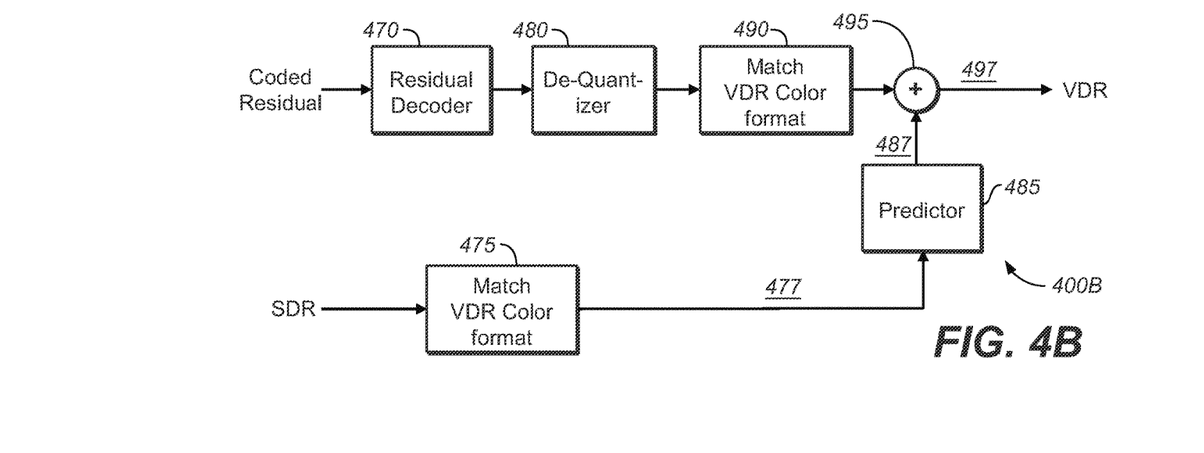
FIG. 4B depicts an example of color-format processing in a layered VDR decoding system.

FIG. 4B depicts color format operations on a decoder corresponding to the encoder depicted in FIG. 4A. Since the encoder predictor 420 operated in VDR color format, on the decoder, predictor 485 (with output 487) needs to operate in VDR color format as well. This configuration requires two color format transformation operations: a) block 475, which transforms the base layer from an SDR color format to the VDR color format 477, and b) block 490, which transforms the de-quantized residual (from residual decoder 470 and de-quantizer 480) from the residual encoder's color format to the VDR color format.

From FIGS. 4A and 4B, this VDR coding implementation requires two color-format transformations in the encoder and two color-format transformations in the decoder. A far more efficient configuration according to an example embodiment of our invention is depicted in FIGS. 5A and 5B.

Figure 5A:
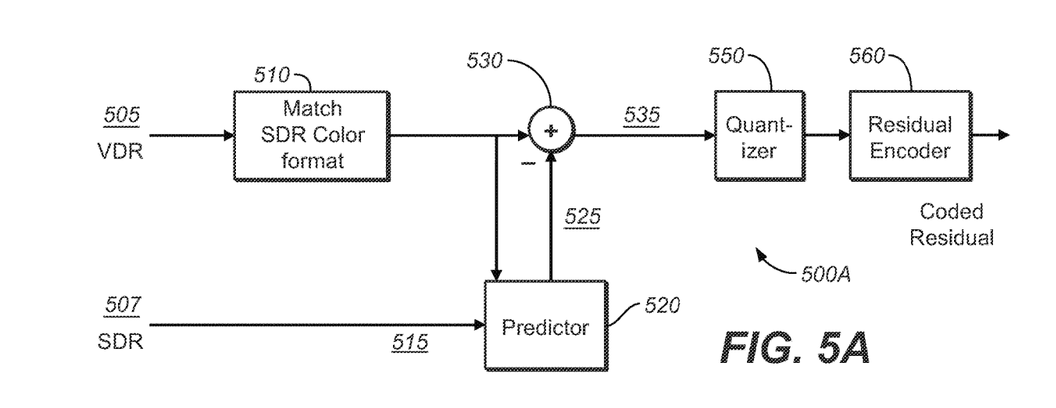
FIG. 5A depicts an example of color-format processing in a layered VDR encoding system according to one embodiment of this invention.

FIG. 5A depicts an example color-format transformation process for a VDR encoder when the predictor 250 (520) operates in the SDR color format 515. In this implementation, there are no color-format transformations on the SDR input 507. Instead, transformation block 510 transforms the color format of the VDR input 505 to match the color format of the SDR input. For example, if VDR input is in RGB 4:4:4 and the SDR input is in YCbCr 4:2:0, then block 510 will preserve the bit precision of the VDR signal, but will transform it to YCbCr 4:2:0. In this implementation, both the output 525 of the predictor 520 and residual output 535 will be in YCbCr 4:2:0 format. If the residual encoder 560 (after quantizer 550) operates in the same color format of the SDR input (say, YCbCr 4:2:0), then no additional color format transformations are needed in the encoder.

Figure 5B:
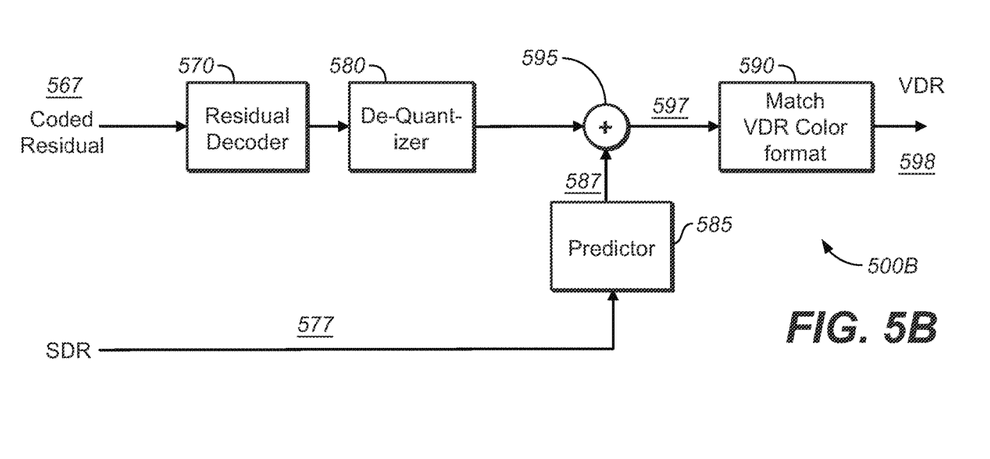
FIG. 5B depicts an example of color-format processing in a layered VDR decoding system according to one embodiment of this invention.

FIG. 5B depicts color format operations on a decoder corresponding to the encoder depicted in FIG. 5A. Coded residual signal 567 is decoded by residual decoder 570 and then de-quantized by de-quantizer 580. Since the encoder predictor 520 operates in SDR color format, predictor 585 needs to operate in SDR color format 577 as well. Thus the output signal 597, representing an enhancement layer 567 added to the output 587 of the predictor 585, will also be in the SDR color format. Finally, transformation operations in block 590 transforms signal 597 from the SDR color format (say, YCbCr 4:2:0) to the desired color format for output VDR signal 598. The final output format can be the same as the input VDR color format, say RGB 4:4:4, or a different one, for example one matching the requirements of a target VDR display.

In an example implementation, assuming that VDR input is in RGB 4:4:4 color format and that the SDR input is in YCbCr 4:2:0 format, comparing the computational requirements between the VDR color format-based coding method (400) and the SDR color-format based coding method (500) we can derive the following computational savings:

On the encoder: (a) Due to chroma subsampling, predictor 520 and adder 530 operate on half the chroma pixel samples than predictor 420 and adder 430, and (b) encoder 400A requires an additional "Match VDR color format" block than encoder 500A.

On the decoder: (a) Due to chroma subsampling, predictor 585 and adder 595 operate on half the chroma pixel samples than predictor 485 and adder 495 (which outputs VDR 497), and (b) decoder 400B requires an additional "Match VDR color format" block than decoder 500B. Furthermore, in decoder 500B, color-format transformation block 590 can be eliminated or combined by another color transformation block, depending on the application and the requirements of the device receiving the output VDR signal 598.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to color-format transformations, such as those described herein. The computer and/or IC may compute, any of a variety of parameters or values that relate to color-format transformations as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement color format transformation methods as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to applying color format transformations in coding and decoding VDR and SDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. In a layered video encoder, a method of coding video signals to reduce color format conversion operations, the method comprising:
  receiving a first video signal having a first dynamic range in a first color space and a first chrominance sampling format of a first color format;
  receiving a second video signal corresponding to the same content as the first video signal, wherein the second video signal has a second dynamic range in a second color space and a second chrominance sampling format of a second color format, wherein the second dynamic range is smaller than the first dynamic range, wherein the second chrominance sampling format of the second color format is different from the first chrominance sampling format of the first color format, and wherein the second color space of the second color format is different from the first color space of the first color format;

generating a third video signal based on the first video signal by converting the first video signal in the first color space of the first color format into the third video signal in the second color space and the second chrominance sampling format of the second color format while preserving the first dynamic range;

determining a predicted video signal of the third video signal in the second color space of the second color format based at least on the second video signal, the predicted video signal having the first dynamic range in the second color space and the second chrominance sampling format of the second color format;

coding the first video signal using a coded base layer stream and a coded enhancement layer stream of a coded bitstream, wherein the coded base layer stream comprises a coded representation of the second video signal, and the coded enhancement layer stream comprises a coded representation of a residual between the third video signal and the predicted video signal;

causing a recipient device of the coded bitstream to generate a decoded image from the coded bitstream for rendering.

2. The method of claim 1, wherein the first video signal comprises a visual dynamic range (VDR) signal and the second video signal comprises a standard dynamic range (SDR) signal.

3. The method of claim 2, wherein the VDR signal comprises an RGB 4:4:4 color format and the SDR signal comprises a YUV or YCbCr 4:2:0 color format.

4. The method of claim 1, wherein determining the predicted video signal comprises using a multiple-color channel multiple-regression (MMR) predictor.

5. The method of claim 1, wherein generating the coded enhancement layer stream further comprises:
quantizing the residual with a non-linear quantizer to generate a quantized residual signal with the second dynamic range; and
coding the quantized residual signal with a video encoder to generate the coded enhancement layer stream.

6. The method of claim 1, wherein in a decoder, a method of decoding the coded first video signal comprises:
decoding the coded base layer stream to generate a decoded base layer signal in the second color format;
decoding the coded enhancement layer stream to generate a decoded enhancement layer signal in the second color format;
determining, using a predictor, a decoder predicted signal in the second color format in response to the decoded base layer signal;
generating an intermediate output signal based on the decoded enhancement layer signal and the decoder predicted signal, the intermediate output signal having the first dynamic range and the second color format; and
determining a decoded representation of the first signal by transforming the intermediate output signal from the second color format into a final output color format, the final output color format being different from the second color format.

7. The method of claim 6, wherein the final output color format comprises the first color format.

8. A method of decoding a visual dynamic range (VDR) video signal in a video codec comprising a base layer and an enhancement layer, the method comprising:
receiving a coded VDR stream comprising a base layer stream and an enhancement layer stream, wherein both the base layer stream and the enhancement layer stream are to be used to generate a reconstructed version of a first video signal having a first dynamic range in a first color space and a first chrominance sampling format of a first color format;

wherein the base layer stream comprises a coded representation of a second video signal having a second dynamic range in a second color space and a second chrominance sampling format of a second color format;

wherein the enhancement layer stream comprises a coded representation of a residual between a third video signal and a predicted video signal of the third video signal;

wherein the third video signal was generated by an upstream encoder based on the first video signal by converting the first video signal in the first color space of the first color format into the third video signal in the second color space and the second chrominance sampling format of the second color format while preserving the first dynamic range;

wherein the predicted video signal of the third video signal was determined by the upstream encoder based at least on the second video signal, the predicted video signal having the first dynamic range in the second color space and the second chrominance sampling format of the second color format;

wherein the second chrominance sampling format of the second color format is different from the first chrominance sampling format of the first color format and wherein the second color space of the second color format is different from the first color space of the first color format;

decoding the base layer stream to generate the second video signal having the second dynamic range in the second color space and the second chrominance sampling format of the second color format;

decoding the enhancement layer stream to generate the residual between the third video signal and the predicted video signal of the third video signal;

generating, using a predictor, the predicted video signal of the third video signal in response to the decoded second video signal;

generating a VDR intermediate output signal in the second color space and the second chrominance sampling format of the second color format based on the residual between the third video signal and the predicted video signal of the third video signal and the predicted video signal of the third video signal;

transforming the VDR intermediate signal from the second color space and the second chrominance sampling format of the second color format to the first color space and the first chrominance sampling format of the first color format to generate the reconstructed version of the first video signal having the first dynamic range in the first color space and the first chrominance sampling format of the first color format;

causing a reconstructed image in the reconstructed version of the first video signal to be rendered.

9. The method of claim 8, wherein the second color format comprises a YUV or YCbCr 4:2:0 color format.

10. The method of claim 8, wherein the first color format comprises an RGB 4:4:4 color format.

11. The method of claim 8, wherein generating the decoded VDR enhancement layer signal further comprises:
decoding the enhancement layer stream with a video decoder to generate an SDR enhancement layer signal;
dequantizing the decoded SDR enhancement layer signal with a non-linear dequantizer to generate the decoded VDR enhancement layer signal.

12. An apparatus comprising one or more processors and one or more non-volatile computer-readable storage media storing instructions, which when executed by the one or more processors, cause the one or more processors to perform a method as recited in claim 1.

13. An apparatus comprising one or more processors and one or more non-volatile computer-readable storage media having stored instructions, which when executed by the one or more processors, cause the one or more processors to perform a method as recited in claim 8.

14. One or more non-volatile computer-readable storage media having stored instructions, which when executed by one or more processors, cause the one or more processors to perform a method as recited in claim 1.

15. One or more non-volatile computer-readable storage media having stored instructions, which when executed by one or more processors, cause the one or more processors to perform a method as recited in claim 8.

* * * * *